United States Patent [19]
Brent et al.

[11] Patent Number: 5,495,614
[45] Date of Patent: Feb. 27, 1996

[54] INTERFACE CONTROL PROCESS BETWEEN USING PROGRAMS AND SHARED HARDWARE FACILITIES

[75] Inventors: Glen A. Brent, Red Hook; Thomas J. Dewkett, Staatsburg; Casper A. Scalzi, Poughkeepsie, all of N.Y.

[73] Assignee: International Business Machines Corporation, Armonk, N.Y.

[21] Appl. No.: 355,756

[22] Filed: Dec. 14, 1994

[51] Int. Cl.$^6$ ................................................. G06F 9/00
[52] U.S. Cl. ........................... 395/700; 364/DIG. 1; 364/280; 364/DIG. 2; 364/942.2
[58] Field of Search ...................................... 395/700

[56] References Cited

U.S. PATENT DOCUMENTS

| | | | |
|---|---|---|---|
| 4,807,121 | 2/1989 | Halford | 364/200 |
| 4,831,523 | 5/1989 | Lewis et al. | 364/200 |
| 4,901,234 | 2/1990 | Heath | 364/200 |
| 5,142,672 | 8/1992 | Johnson et al. | 395/500 |
| 5,241,661 | 8/1993 | Concilio et al. | 395/275 |
| 5,274,795 | 12/1993 | Vachon | 395/500 |
| 5,287,471 | 2/1994 | Katayose | 395/425 |
| 5,301,279 | 4/1994 | Riley et al. | 395/275 |

OTHER PUBLICATIONS

Anderson, Gail & Paul, "The Unix C Shell Field Guide", pp. 303–304, Prentice–Hall, 1986.

*Primary Examiner*—Kevin A. Kriess
*Assistant Examiner*—St. John Courtenay, III
*Attorney, Agent, or Firm*—Bernard M. Goldman

[57] ABSTRACT

A control process which enables a non-supervisory "using program" (e.g. application programs) to directly interface one or more shared asynchronous hardware facilities in a computer system. Any using program may request the operating system (OS) to set up a "special environment" with an AHF during which the using program can directly issue requests to the AHF for its services. The OS sets up a session for the using program having the "special environment", which specifies restrictions on storage accesses by the AHF for accesses made on behalf of the using program—to insure system data integrity. These restrictions are not changeable by the using program. The "special environment" exists until the session is ended by the using program or by a terminating condition. The "special environment" is tailored to be different among the different using program concurrently using the same AHF, so that the "special environment" of one using program cannot interfere with the "special environment" of another using program. During a session, work requests for any using program are communicated directly to the AHF from the using program, and completion of any work request is communicated directly by the AHF to the using program without any interruption of the using program or OS involvement.

17 Claims, 8 Drawing Sheets

STATES:
R: REQUEST READY
I: IN PROCESS
C: REQUEST COMPLETE
E: EMPTY
Q: END SESSION

ACTIVE SESSION TABLE SECTION — 420

| LOCK | SESSION # |
| LOCK | ... |
| LOCK | SESSION # |
| LOCK | SESSION # |

421 — LOCK
422 — NUMBER OF ALET/STD PAIRS (N)
423 — SESSION #
424 — ALET 1 | STD 1 | KEY 1
426 — STD
427 — KEY

| ALET 1 | STD 1 | KEY 1 |
| ALET 2 | STD 2 | KEY 2 |
| ALET 3 | STD 3 | KEY 3 |
| ... | ... | ... |
| ALET N | STD N | KEY N |

428 — LIST LOCATION ADDRESS
429 — LIST LENGTH
430 — NEXT REQUEST ADDRESS

ACTIVE SESSION TABLE (105)
OF ASYNCHRONOUS FACILITY

FIG.4B

USING PROGRAM REQUEST FOR SESSION ACTIVATION — 500

| NUMBER OF ADDRESS SPACES (N) | — 501 |
| AS ID 1 | — 502 |
| AS ID 2 |
| AS ID 3 |
| ... |
| AS ID N |
| LIST LOCATION ADDRESS | — 503 |
| LIST LENGTH | — 504 |
| FACILITY TYPE | — 505 |

FIG.5

INTERFACE CONTROL PROCESS BETWEEN USING PROGRAMS AND SHARED HARDWARE FACILITIES

INCORPORATION BY REFERENCE

The specification incorporates by reference into the subject specification the following issued patent and prior-filed patent applications:

U.S. Pat. No. 4,476,524 entitled "Page Storage Control Methods and Means", assigned to the same assignee as the subject invention.

U.S. Pat. No. 5,237,668 entitled "Processing Using Virtual Addressing in a Non-Privileged Instruction to Control the Copying of a Page in or Between Multiple Media", assigned to the same assignee as the subject application.

U.S. Pat. No. 5,442,802 filed Jan. 3, 1992, which is a continuation of application Ser. No. 07/816,917 filed Jan. 3, 1992 entitled "Asynchronous Co-processor Data Mover Method and Means," assigned to the same assignee as the subject application.

U.S. application Ser. No. 08/012,187 filed Feb. 8, 1993 entitled "Load Balancing, Continuous Availability and Reconfiguration Control for an Asynchronous Data Facility," assigned to the same assignee as the subject application.

U.S. Pat. No. 5,377,337 filed Jun. 8, 1993 entitled "Method and Means for Enabling Virtual Addressing Control by Software Users Over a Hardware Page Transfer Control Entity," issued on Dec. 27, 1994, assigned to the same assignee as the subject application.

U.S. application Ser. No. 08/199,041 filed Feb. 18, 1994 entitled "Coexecuting Method And Means For Performing Parallel Processing In Conventional Types of Data Processing Systems", assigned to the same assignee as the subject invention.

INTRODUCTION

This invention relates to an interface control process for enabling non-supervisory "using programs" (e.g. application programs) to directly use shared asynchronous hardware facilities (AHF) in a computer system during a session between a using program and the AHF without operational interference from the OS (operating system) after the OS has established the session.

BACKGROUND OF THE INVENTION

Previously, using programs could only request the services of a shared hardware facility from the OS, which provided a common interface for use by all requests from the using programs. The OS interface was required to protect the integrity of data in the computer system by isolating the independent uses from each other. That OS interface is eliminated by this invention, which instead, allows the OS to set up a tailored "special environment" for each using program wanting tic use a shared hardware facility. The "special environment" is set up by the OS in response to a using program requesting use of a shared facility. The OS sets up each "special environment" with specific restrictions on the using program's direct interface to the services and passes these restrictions to the hardware facility which stores them as a check on each individual request received from a using program. It is these specific restrictions that enable the using program to have direct use of the requested facility and still key it isolated from the other independent users of it, maintaining system data integrity despite the shared use of the facility. These restrictions are not changeable by the using program. Under the umbrella of this "special environment", the using program can issue any number of direct operational requests to the facility without making the requests to the OS as an intermediary, which has the advantage of avoiding the OS service call and resulting interruptions to the using program for such OS services. Accordingly, each "special environment" is tailored to be different for the different using programs. The "special environment" continues for each using program until ended by the using program, or by occurrence of special conditions. More than one special environment may exist concurrently for shared concurrent use of a hardware facility.

Asynchronous facilities that operate in conjunction with a central processing unit (CPU) in the past have required an application program, or programming subsystem, to create the entire command to be processed prior to invocation of the facility. For example, the Asynchronous Co-processor Data-Mover, described in U.S. Pat. No. 5,442,802 referenced herein, requires that the data to be moved and the addresses involved in the move be known, and be structured for use, prior to the operating system call for each request for facility services by an application program. In fact, the complete set of address and data specification is passed to an operating system interface service as part of the call parameters for each request. These parameters are then checked by the operating system interface service, which constructs a command block, invokes the operation, and eventually accepts an interruption signal from the facility when the operation completes.

Because of a large number of programming steps required by the prior OS interface service, e.g. for the checking and construction of the co-hand block, in issuing the I/O instruction for each request, in later taking the interruption for each request, in processing the completion of each request, and finally in providing notification back to the using application program or subsystem for each, it was not economically viable for the prior Asynchronous Co-processor Data-Mover Facility to handle requests to move small amounts of data. The economic break-even point for this prior asynchronous facility is model-dependent and will change over time, and an example of it is a high-end currently available IBM System/390 Central Electronic Complex (CEC) on which an application request must move at least 64 Kilo-bytes of data per request to obtain an economic advantage. Below this data size, it was more efficient to move the data via CPU synchronous means, such as the S/390 MovePage instruction described in U.S. Pat. No. 5,237,668.

The economic impact of the subject invention is to greatly lower this economic break-even point and allow much smaller amounts of data to be economically moved in a single operation without changing the asynchronous hardware facility.

In that prior shared asynchronous hardware facility, a major aspect of the overhead of each operation was the use of the operating system (OS) as an intermediary in each using program request for that facility. This was necessary where the use of one or more asynchronous hardware facilities was to be shared among various independent using programs. The OS maintained system integrity by checking the validity of the parameters supplied to the facility in each operational request for each using program (e.g. application program), and buffered the shared facilities from the programs by maintaining necessary queues, etc. An example of one type of asynchronous shared hardware facility is described in U.S. Pat. No. 5,377,337 incorporated herein.

Thus, each use of the facility required a discrete package of specific operations to be performed. The OS interface must validity-check the requested operation addresses, package them into the proper format for the facility invocation, find a free facility for use or queue the request for later use, and issue the request. Later, the facility notifies the OS of request completion, which in turn is communicated by the OS to the requesting using program.

However, there is another class of applications which, either by design or data-generation characteristics, do not have the ability to block data in large chunks without incurring significant processing penalties. These applications (jobs) are composed of multiple program segments (job steps) which execute sequentially, each of which processes a very large file of data. The data to be processed are input to the first job step which completely processes the data before passing the resulting data to the second job step for additional processing, and then the resulting data may be processed by a third job step, and so forth until the final results are produced by the last job step. Each job step runs to completion before the subsequent job step is be initiated. Historically, complex business problems were solved by this style of batch programming. The data is retrieved from a file on an I/O device and the modified results are returned to another I/O device, from which the next job step in the job accesses the data. Thus, between each job step there exists an intermediate file on some I/O device.

Because of the multiple processors and large electronic storage of modern computers, it is possible to restructure this type of large business problem such that program segments (job steps) execute concurrently instead of running consecutively. The data passing between the program segments can be moved from storage to storage in blocks of records such as was used in I/O operations used previously. The data need not be written to any temporary I/O storage device, but transferred directly in electronic storage. For example, to obtain parallel execution of the separate programs of such a complex programmed business process, the data should pass from the output buffer of one job step to the input buffer of the next job step, with possible intermediate in-storage buffering by a system service to obtain proper logical synchronization of execution of the two programs.

The transfer out of the output buffer of one program into the input buffer of the other program occurs at the same logical point in each program's execution as I/O would have occurred in each, in the original mode of operation. The OS interface service can perform transparently, managing storage-to-storage data movement as a replacement for I/O. The application programs need not change to obtain this improved operation efficiency, which reduces the overall time of execution of the entire process dramatically in this example, by avoiding the time of input-output operations.

There are other functions that can be performed (to improve overall system performance) by an asynchronous hardware facility which can be instructed to perform its operations on a small amount of data per request. In another example, in an interactive query processing environment with data records stored in compressed form where a compress/expand asynchronous facility is provided in the CEC, it would be desirable to expand only the data records that are relevant to a particular query, or the subset of the records for the query that are currently available in electronic storage. Also, where a complex query is performed by a repetitive process of input of records and computation on the records read, because of the large amount of data that must be examined, the asynchronous facility can be directly requested to expand the records in the I/O buffer after each read operation. It is impractical in many cases to have all or most of the data records in electronic storage at any one time.

SUMMARY OF THE INVENTION

In the prior art, the asynchronous hardware facility (AHF) had to be invoked by the OS for each work request, requiring an operating system call, and each using program request required OS processing time to validate and initiate the request and for the OS to later process the completion interruption for the request. This operating system processing limited the efficiency of the AHF, since only user requests to process large amounts of data could overcome such OS invocation cost by off loading enough CPU processing to compensate for the initiation and termination overhead. In cases where the request was for moving small amounts of data (one or a few pages), it was less costly in processing time to not use the AHF and for the CPU to perform the function synchronously in the prior art synchronous hardware facility (i.e., entirely under CPU control). Such prior OS invocation costs of the asynchronous AHF function resulted in an economic "cross-over" point in the amount of data to be handled below which it was cheaper to use the synchronous hardware facility (which reduced CPU efficiency). Thus, user requests that did not process more than the cross-over-point amount of data were more economical if done synchronously, even if the using program requests were part of a sequence of operations that processed very large amounts of data.

The invention overcomes this "cross-over" requirement for a minimum work request size, when many work requests are to be issued for a single process, by allowing the using program (an application program or a programming subsystem) executing for a non-supervisory state to perform the requirement work as a series of small requests that are made over a period of time. The using program may make a single invocation request through the OS prior to its first work request, for which the innovation requesting the OS (operating in privileged state) invokes the AHF with a control block containing the OS-validity-checked and translated parameters that were supported by the using program. This invocation control block, when passed to the AHF as the operand of the "start" instruction establishes an Active Session Table Entry in the Active Session Table in system memory which addresses a Work Request List in the requesting program's own virtual address space.

It is the main object of the subject invention to allow multiple programs, of different storage access capabilities, to share use of one or more shared asynchronous hardware facilities (AHFs) in a manner which allows efficient use of an AHF regardless of whether the using programs are requesting the processing of small or large amounts of data (i.e., whether only one page, or a large number of pages are being processed per using program request).

With this invention, using programs are able to directly request the AHF to perform multiple discrete operations using direct communication with the AHF, and without communication among the using programs, and without OS operation during a working session. Each using program remains isolated within its own respective storage access domain constraints and is unable to use the AHF to breach the system's data integrity.

The invention uses the OS only for initiating and terminating a working session between a using program and the AHF, during which session all of the using program's constraint parameters are enforced in the performance of all work requests made by the using program during the existence of the session being established. Enforcement of the using program's access constraints is by the AHF when it is operating for any using program request—to ensure system data integrity. The process for setting up a using program's work session with the AHF is done by the OS, in response to the using program making an work session invocation request to the OS. Then the OS processes the invocation, during which the using program execution on a CPU is interrupted to allow the OS use of its CPU to set up the AHF session for the using program. Once established, the active session (if multiple work requests) requires no further OS interaction until terminated by the using program or by exception.

Each AHF is comprised of one or more independent AHF processors, which may service any number of using programs, which may be non-privileged programs. The AHF and its processors need not be dedicated to any particular CPU or to any using program. The AHF processors communicate the completion of each work request to its requesting program without any hardware-to-software interruption and without any OS processing, barring the occurrence of an exception condition in the operation of the system in performing the AHF work.

It is a further object of this invention to enable multiple "using programs" (such as programmed applications, and programming sub-systems) to initiate work requests on an AHF in a secure and controlled manner, without OS intervention for each work request. This increases the system efficiency in use of the AHF for handling both small and large amounts of data, i.e., one or more logical or physical records may be efficiently handled per work request.

It is also an object of this invention to have multiple using programs to have concurrent direct use of a single AHF, or of multiple AHFs, without degrading the individual storage access authorizations or system protection controls for the different using programs, while improving the efficiency of AHF operations. Multiple using programs can be concurrently requesting processing by any AHF, each through its own separately initiated and authorized session, without concern for the concurrence of utilization of the AHF by other using programs, since the AHF will automatically detect and execute each request, and provide all of the required address-space authorization and storage access checking normally enforced by the CPUs of the CEC when they access system storage for any using program. In other words, storage accesses by the AHF on behalf of each using program are restricted to the using program's separate and unique storage access constraints. These constraints are established by OS communication to the AHF at the invocation of each using program's session with the AHF.

It is another object of this invention to provide an interface which relieves the OS of workload balancing and error recovery tasks previously done by the central processors (CPUs), by enabling the processors in each AHF to dynamically share the workload being processed by the AHF for multiple requestors (using programs), for which any AHF processor may service any outstanding work request, regardless of the originating using program, and without using the OS as an intermediary for notifying the using programs of any work request or its completion.

It is further object of the invention to provide a single direct interface to each of plural AHFs for all using programs in a system. The interface masks a multiplicity of AHF processors (which comprise the AHF) from each of multiple using programs. The interface also masks each of the multiple using programs from any consequences of their shared use of the AHF.

The preferred embodiment of this invention provides each using program with a Work Request List and provides the AHF with an Active Session Table (AST) having respective sections assigned to the respective using program work sessions. Each AHF becomes available to do work for a using program only when the AHF has a section in its AST for that using program. Each using program puts its requests to the AHF in its work request list, and the AHF processors scan the work request lists of all of the using programs to obtain AHF work.

Each of the using programs may be independent of each other, or they may have inter-relationships, such as if a using program is a programming subsystem under which is operating a plurality of using programs. In that case, both the subsystem and its using programs may each be a using program under the subject invention, in which each may be requesting use of an AHF.

For any using program to use this invention, the using program must first make an invocation request to the OS for a work session with the AHF (if there is more than one type of AHF in the computer system it must identify the particular type). Each type of AHF may consist of one or more AHF processor(s). This is not a concern of a using program, however. The using program's invocation request contains an address at which the using program locates its work request list, and also contains address space(s) identifier(s) for indicating the address space(s) in which the using program requests the AHF to make accesses for it. The using program's address space(s) are verified by the OS when the OS sets up the session for the using program, wherein the OS verifies the capabilities and address parameters that will constrain the AHF when making accesses for that using program during the life of that session.

Therefore, when the OS is processing an invocation request, the OS verifies the using program's communicated parameters for the working session against the access constraints of the requesting programs. If they are represented in a virtual form, the OS translates the constraints to a form that allows the AHF to perform address translation (i.e. translates the Access List Entry Token in S/390 to a Segment Table ID), and may add any needed constraint parameter (such as a storage key) required by the AHF in performing the constrained storage accesses. The OS puts the user's work request list address, and address space constraints, into a "session activation specification" (which is put in a part of a control block in storage called an "operation block") .

The OS sends the "session activation specification" to the AHF by executing the "start session" instruction whose definition includes the address of the session activation specification, and the AHF copies the "session activation specification" into a section of its AST to activate the using program's work session. The AHF also adds to that AST section the AHF identifier on which the session was invoked (which may be a subchannel identifier assigned to the AHF). The AST also contains a "next request address" entry for containing an address of the next entry in the work request list at which to start the next scan for a ready entry containing a work request. Initially, the "next request address" entry is set to address the first entry in the work request list, at which the first AHF scan will start. After any scan finds a ready entry, the AHF sets the "next request address" entry to the address of the following entry in that work request list, since it will perform the request originally addressed. This allows another processor of the same AHF to perform the next work request concurrently.

The AST section also has a lock field for use when there are more than one AHF processors to prevent contention among the AHF processors. The AST section lock field is set to an off state when the AST section is activated.

Initially, a status field in every entry in the work request list is set to an "empty" (E) state.

Then, the using program's work session is activated in response to the OS request to do so, which completes the user's invocation request. After activation, the using program may put AHF work requests into its work request list, which will initially be scanned by the AHF at its first entry.

Essentially, the invocation creates an operating session between the using program and the AHF, during which the using program may make repeated direct requests to the AHF, and directly receive completion reports from the AHF—through the using program's work request list which acts as a storage communication area—and no OS intervention occurs during normal operation. All accesses to the using program remain completely constrained by the storage access constraints provided by the OS when it requested establishment of a session. These constraints can include address space specification used storage keys to be used by the AHF in accessing storage whenever the AHF is acting for the using program.

Whenever any AHF processor becomes inactive and needs to find new work, it uses the lock field of an AST section to obtain exclusive processing control of that entry (so no other AHF processor will change any field in the AHF section. Then the AHF processor accesses the "next request address" entry in an AHF section to locate a worklist entry at which to start a scan for a ready entry containing a work request.

AHF processor(s) scans all activated work request lists which are addressed by all active AST sections. The AST sections are examined by the AHF processors in a round-robin manner for selecting a work request list for scanning.

The scanning of the work request lists is the communication process used by all AHF processors to obtain AHF work requests from all using programs. During each scan of any work request list, the AHF examines the status field in each scanned entry in the work request list until the AHF finds a scanned entry containing a "ready" (R) state in its status field. The AHF accepts the entry by setting its status field from R state to an "in process" (I) state. And then the AHF puts the address of the next entry in the work request list being scanned into a "next request address" entry in the AST section identifying that work request list.

Also, each AHF processor internally stores the address of the currently accepted entry in the work request list at the time the entry is accepted for processing. The AHF processor will need this address to locate the current entry to mark its status field with a "complete" (C) state when that AHF processor has completed the work requested in that entry.

The using programs may use the method of this invention while running in problem state (i.e. non-supervisory state). This is because the AHF processors are constrained to access only storage areas allowed to the using programs (including any storage key constraint). These constraints are setup by the OS, during the session invocation, at which the OS establishes an operating environment within which the using program may directly make repeated requests, and directly be notified of the completions—directly between the using program and the asynchronous hardware facility—without any involvement by the OS, yet the OS has completely protected all system data and the operational integrity of the computer system since the user program cannot use that AHF to access storage outside of its AST defined bounds during its use of the asynchronous hardware facility. Each using program may have a different addressing and storage key capability defined in its AST section.

Each using program request for a session invocation may define the user's work request list either with real or virtual address space values or identifiers. When defined in virtual values, the OS must translate them to real addresses for the associated user AST section used by the AHF processors.

The work request list is organized as a single list of work request entries received from its using program. This list may be treated as logically circular by the AHF processor(s). Work requests may be placed sequentially in the entries of this list by the using program, and they may be processed by the AHF in first-in-first-out (FIFO) order. Note that each work request list entry is placed in the work request list by the using program without calling the OS; and this avoids operating system call overhead. The entry is then automatically detected and processed by the AHF, and completion of work for the entry is indicated by the AHF back in the Work Request List Entry, without hardware interruption or OS intervention or signalling.

A session will remain active until its using program requests that it be terminated (by setting the status field in the next entry to a "quit" (Q) state. On the next AHF scan of the work request list, this Q state is detected by an AHF processor. The AHF processor responds by waiting until all work is completed for all entries in this work request list already being processed by an AHF processor, which it determines by sensing that no entry in the list has a status field indicating the I state; and then the AHF processor sends an interruption pending signal to the OS for that using program, so that the OS can then do any housekeeping steps needed to end that user's work session. A user's work session may also be ended if a terminating exception occurs (such as a storage access exception) in the using program. Generally, the user work session need not end if an exception occurs within the AHF processor doing the work, since the error recovery within the AHF may then shift the current entry in a failing AHF processor to another AHF processor which can continue the processing for that list entry.

Accordingly, as the using program is placing work requests on its work request list, the AHF processors will detect the work requests, perform them, and then mark them complete. A using program may have more than one work request outstanding in its Work Request List, those requests being executed by plural AHF processors.

The using program must observe the completion state C for any of its list entries, and then the using program must take action on it such as processing data in storage represented by the completion state. When the using program recognizes the completion state C, and no longer has a need for it, the using program writes the empty E state in the entry, which allows the using program to re-use that entry for another request at a later time. There is no hardware interruption of any CPU program, or of any AHF processor execution, on a work request completion, so the OS is not involved.

Thus, the invention provides a very efficient method of handling AHF processing for using programs, which requires only two OS interactions (interruptions) per work session for a using program—the first for OS to initialize the work request list and to establish an active session, and the second for OS to handle the termination interruption and post status back to the using program to signal that all work request list entries have been completed for a normal termination. During the session interval between these two OS interactions, the using program may make any number of AHF work requests.

Accordingly, use of this invention allows any number of AHFs to be efficiently shared by multiple using programs, without interaction among them and without use of the operating system (after initiation)—in a manner that allows concurrent use of a single or multiple AHF processors in the asynchronous hardware facility without degrading the storage access authorization and system protection controls of the CEC and of its OS (i.e., operating system). The asynchronous operation of the AHF does not interfere with the operation of the CPUs in the computer system. Thus, the invention allows direct communication, of work requests and their completion, between the AHFs and multiple using programs (having differing data access authorities) in a CEC without awareness by the using program of the number AHF processors in the AHF.

In this manner, this invention maintains complete system data integrity and complete CEC operational integrity without direct involvement of the OS for each work request.

Although the embodiment in this specification is described using the example of an AHF described in U.S. Pat. No. 5,442,802 entitled "Asynchronous Coprocessor Data Mover", the novel process of this invention can be applied to many different types of asynchronous hardware facilities, such as a data compression facility, an encryption facility, a data filtering facility, and others. It will become apparent that this invention is not limited to data move operations, but is equally usable with many other types of asynchronous processing facilities for which this invention can provide efficient asynchronous processing concurrent with CPU processing. Any of such AHFs can be adapted to use the work session processes of this invention for one or more using programs having activated work request lists.

SUMMARY OF THE DRAWINGS

FIG. 4B shows Active Session Table Sections used by the AHF to communicate with the activated work request lists.

FIG. 5 shows a form of an invocation request which may be provided to the OS by a using program to request initiation of a session with the AHF.

DESCRIPTION OF THE DETAILED EMBODIMENT

Figure 1:
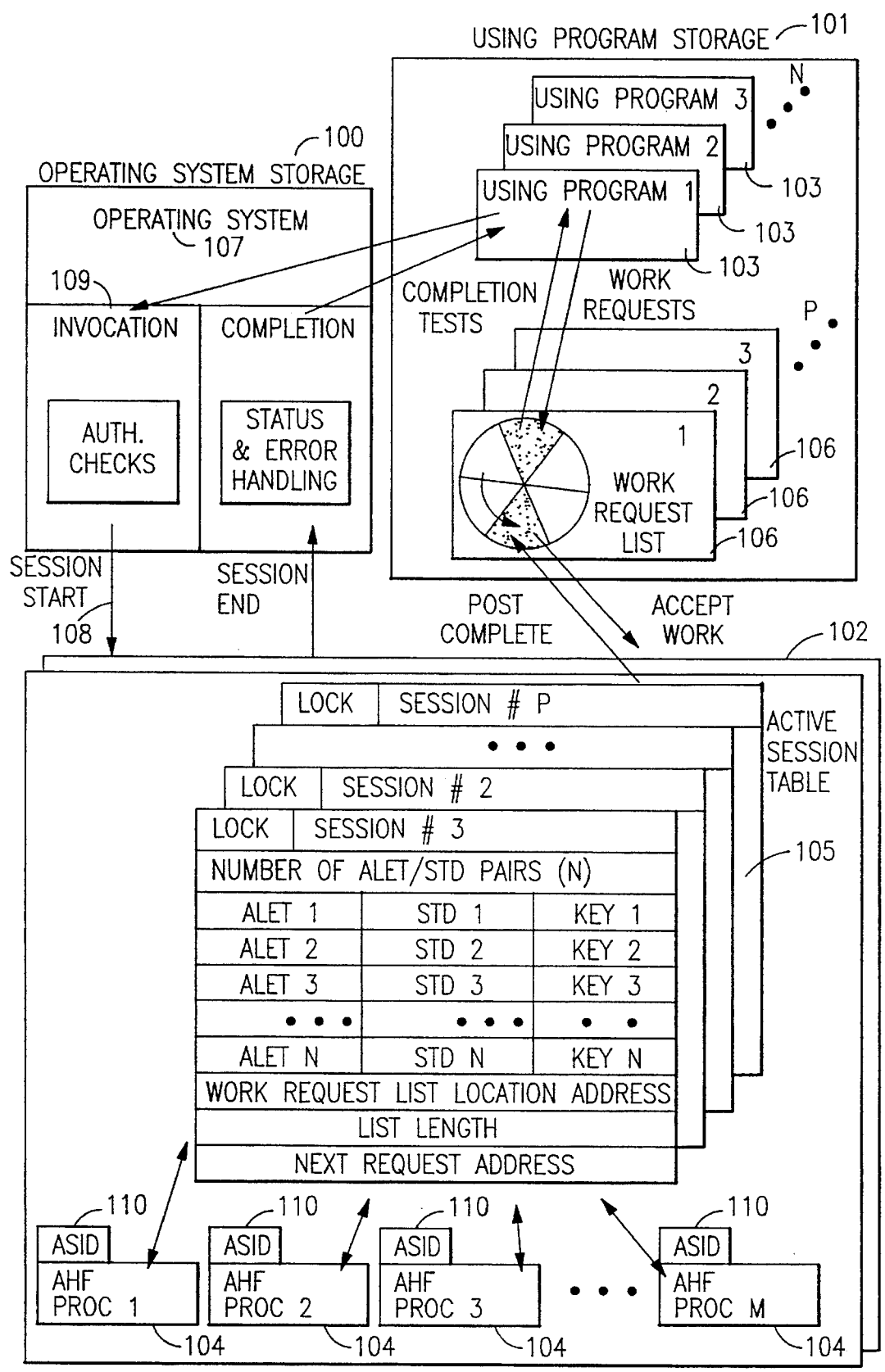
FIG. 1 shows an overall structure of hardware and software components of a system including Using Programs 103, an OS program 107, Work Request Lists 106, Active Session Table 105, and the hardware Asynchronous Hardware Facility (AHF) 102 and AHF processors 104 (which may be called service processors). It also shows major communications paths from using programs 103 to the OS program 107, from the OS program to the AHF 102, and importantly between the using programs 103 and the AHF 102 using work request lists 106.

FIG. 1 shows the main elements used in the preferred embodiment, which is shown in three separate system authority controlled domains 100, 101, 103. These domains include: an operating system (OS) storage area 100, a plurality of using program storage areas 103, and an asynchronous hardware facility (AHF) 102. The using programs areas 103 are in different virtual address spaces respectively assigned to the using programs in which each area 103 contains an independent using program (e.g. application program). Each using program 103 may execute on any central processor (CPU), not shown, in a Central Electronic Complex (CEC), not shown. In the preferred embodiment, the CPUs and the CEC are conventional, and are built to the IBM S/390 architecture used in current commercial multiprocessing mainframe and the CEC contains one or more software operating systems (OSs) to control the resources of the CEC. The OS in the preferred embodiment is the IBM MVS/ESA (Multiple Virtual Spaces/Enterprise System Architecture) operating system.

The OS storage area 100 contains programs and control data not accessible to the using programs 103. The OS programs and data manage the sharing of CEC resources (such as the CPU's and electronic storage) among the independent using programs. One such CEC resource is an asynchronous hardware facility (AHF) 102 shown within its own operating domain 102 in FIG. 1. AHF 102 contains any number (one or more) of AHF processors 104 (sometimes called "service processors"), which may be built to a different computer architecture than the CP's of the CEC (such as the IBM PowerPC architecture).

The preferred embodiment has a plurality of AHFs, and the AHF functions are asynchronously performed by the multiplicity of AHF processors 104. The AHF processors use the active session table 105 to coordinate their execution so that they work as a group concurrently perform work requests received from the using programs. The AHF processors are not dedicated to any particular work request nor to any particular using program.

A working session may be requested by any using programs 103 with the AHF. This is done by the using program setting up and providing the OS 107 with the invocation request parameter list shown in FIG. 5 when it makes the request to the OS 107 to establish the working session with the AHF 102. The invocation request may be made by a program call from the using program to the OS, such as by having the using program executing an S/390 supervisory call (SVC) instruction to the OS. This suspends the using program execution on a CPU, and requests the OS to execute on the CPU for setting up the requested working session. The S/390 SVC instruction is well known in the prior art, although not previously adapted for this purpose.

Figure 3A:
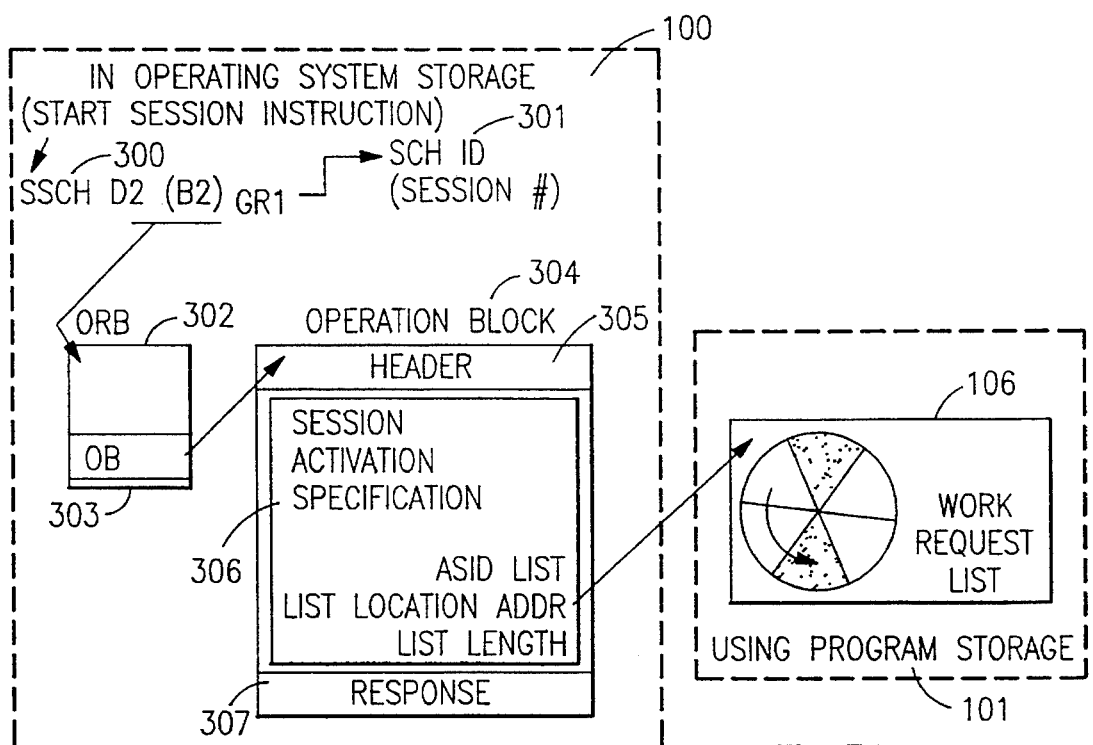
FIG. 3A exemplifies a start session initiation instruction—by showing it as a S/390 SSCH (start subchannel instruction)—which sets up the work session between the requesting using program and the AHF.

Upon the interruption by the using program call, the OS sets up the control blocks 302 and 304 shown in FIG. 3A required for the OS to execute a supervisory-state "start session instruction", which in the preferred embodiment is an S/390 start subchannel (SSCH) instruction 300 shown in FIG. 3A. Execution of the start session instruction 300 by OS processing is part of the invocation process for establishing the requested working session. When setting up blocks 302 and 304, the OS does necessary authorization checks (see box 109), and uses the received parameter list (shown in FIG. 5) to establish a "session activation specification" in block 304 which specifies the necessary access constraints that will be enforced by the AHF 102 after the working session is set up.

As part of the "session activation specification", the OS supplies the AHF with an address for locating the work request list 106 and with the using program's access constraints. Then, the AHF adds an entry in an Active Session Table (AST) 105 for the requesting using program, and the AHF puts in that AST entry the received OS information: the using program's address space identifier, the address for locating the work request list 106, and any other of using program's access constraints supplied by the OS.

Following the establishment of a working session, the using program may place any number of work requests into its work request list 106, and they will be executed in their turn by the AHF 102, during which the OS supplied storage access constraints are being enforced on AHF storage accesses for the using program's requests. When any AHF processor 104 completes its work for a work request represented in an work request list entry, the AHF processor will mark the request "complete", which indicates to the requesting using program 103 that the results of the work are available to it.

Under this invention, the OS is not aware of the individual work requests made by the using programs 103 during their working sessions with the AHF 102.

The AHF processor communicates work status information to the using program by simply setting a "work state code" in a "work state field" in the pertinent work request list entry, and the process for doing this does not cause any interruption to the OS 107 (and no OS processing is required or done) or to the requesting using program.

As indicated, multiple independent using programs may execute in the host (OS) environment on one or more CP's of the CEC, and they may concurrently and independently be making work requests to their respective work request lists for use of the same or different AHF(s). Each AHF processor examines the work request lists for new work whenever it is able to accept a new request for execution.

In this embodiment, the AHF examines the user work lists in round-robin-order to approximate a first-in, first-out (FIFO) priority of processing.

When a using program is to normally end its work session (normal completion), this is signalled by the using program writing a completion code in the state field in an entry in the using program's work request list 106 indicating that using program will make no further work requests to the AHF 102. Then, when all previous requests have been completed, the AHF terminates the user program's work session by removing the using program's session entry from the AST 105 and notifying OS 107 of the completion status which requires interruption signalling to OS 107. Thus, there are only two times OS interruptions are used for AHF processing—one to set up the working session and one to end the working session. If a session is terminated for any reason, (normal or abnormal exception) such as by some specification error in a work request, the OS is notified of the termination, and its cause.

Figure 2:
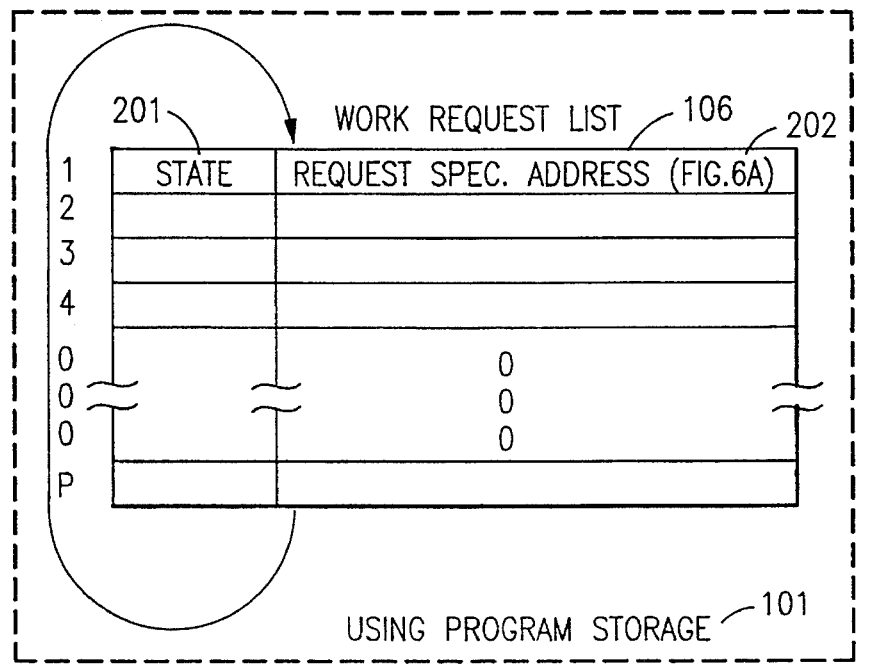
FIG. 2 shows a structure for the Work Request List 106, in which each entry includes a "status field" 201 (used to identify the current state of the list entry), and a "request specification address" 202 pointing to a table shown in FIG. 6A containing the request by the using program in its virtual storage 101.

FIG. 2 shows the detailed format of the Work Request List 106 used in the preferred embodiment. As indicated, the list is accessed logically in a round-robin circle as far as AHF processing is concerned, with the last list entry being followed by the first list entry, and so on. Each list entry contains a state field 201, and a request specification address 202 containing address specification parameters for its contained work request. The address specification parameters are shown in detail in each FIG. 6A and 6B and will be explained when those Figures are discussed.

FIG. 2 shows five operational states which may be set into any state field 201 in a Work Request List Entry. These states include: a Request Ready (R) state which means the work request represented by the Work Request List Entry is available for processing by the AHF, and that no AHF processor 104 has yet accepted it for processing. A request-in-progress (I) state means that an AHF processor 102: has accepted the work request, is processing the request, and has not yet marked it Complete. A Request Complete (C) state means that AHF 102 has finished processing for the request, but the using program has not yet recognized and acted on the completion. An empty (E) state means the entry is currently not being used for any request. A using program 103 changes the state code in field 201 in the entry from C to E when the using program recognizes and acts on the completion (C) state in the entry. The C state indicates to the using program that feedback or result data was placed by the AHF in the using program's storage area for the using program to retrieve and use, and the E state indicates that the using program may re-use the entry for another request for AHF work.

No locking protocol in the work request lists is used between the AHF 102 and by the using program 103 to change an entry from C to E state. The using program cannot, by interface protocol, change a work list entry which is in either the R or I states.

When the AHF processors scan the work request lists for new work, they are looking at the state fields in the list entries for the R state, which indicates the entry contains new work. When an AHF processor accepts an entry for its indicated new work, the AHF processor sets the state to I, and the AHF processor 104 stops its scan of a work request lists.

When a scanning AHF processor accepts an entry in a work request list, it sets a Next Request Address 430 in an associated AST 105 (shown in FIG. 4B) to point to the next work request list entry at which scanning is to start the next time any AHF processor needs to continue the scan of the Work Request Lists 106 for new work. Hence, plural AHF processors 104 independently and concurrently execute different work requests in the lists.

But, new work requests are placed in a list by its using program scanning the list to find the first entry indicating an E state. Initially, the using program will use the list entries in sequential order, but later as the list entries become empty in non-sequential order, the first E state entry found may be used for a new work request.

The Q (quit) state is set in a list entry by any using program to indicate that no further requests will be made to the list, and that the current work session should be ended when all previous requests in the Work Request List have been processed by the AHF processors.

INTERFACE FOR ACTIVATING A WORK SESSION

FIG. 3A shows a special OS-to-AHF processing interface that establishes a working session with an AHF 102 for one of the using programs 103. In response to a using program's request to the OS to set up a working session for the using program, the OS executes a Start Subchannel (SSCH) instruction 300 on one of the CPs.

Although a SSCH instruction is being used here, it is not being used for any I/O operation. It merely uses the I/O architected hardware facilities (adapted for this new use) to support the OS-to-AHF operations. The SSCH instruction has a first operand (GR1) which identifies a general register previously loaded to contain a subchannel identifier (SCH ID) 301, which here is used to address a specific AHF (instead of an I/O device). Here it is used by the OS to notify the AHF of the request for a session invocation by the requesting program. The GR1 content of the SSCH instruction may identify any of multiple AHFs (which may have different SCH IDs and perform different AHF functions). In this manner, any of plural AHFs may be made available to any using program executing on any CP of a CEC, and each AHF may be contain, or share, multiple AHF processors.

It is emphasized that no I/O operation is involved in this invention, and that the I/O subsystem is only used as a communication medium to select the AHF and to notify the AHF of the using program's work request session and constraints on storage accesses for it.

The second operand, D2(B2), of the SSCH instruction contains the address of an Operation Request Block (ORB) 302 which is located in OS storage area 100 in FIG. 1. ORB 302 contains an OB address 303 that locates a unique operation block (OPB) 304 provided by this invention in OS storage area 100 in FIG. 1. OPB 304 contains parameters which are supplied by the OS to the AHF for this particular invocation for a using program using any.

In FIG. 3A, the OPB 304 contains a Header 305 which identifies the OPB 104 as containing a session activation specification (SAS) 306 comprised of an Address Space ID (ASID) list, a work request list starting address (LIST LOCATION ADDRESS), and a list length (LIST LENGTH) for that work request list. The OS copies the SAS to a next table section in an Activation Session Table (AST) assigned to the AHF in real storage accessible only by the AHF. This copying of the SAS into the AST activates the next AST section for the currently requesting using program and enables the using program to start making work requests to the AHF; the work requests will have their storage accesses constrained by the information in the AST corresponding to the active session for this using program.

Hence, the AHF uses the AST section to control storage accesses done by the AHF on behalf of a using program, when the AHF is performing a work request for a using program. The AHF constrains accesses done by the AHF on behalf of a using program using parameters specified for the using program in the AST table section, which thereby represents the current work session approved by the OS between that AHF and the associated using program. In this manner, different AST table sections of each AHF handle accesses for work requests made by different requesting programs to the AHF during different work sessions established by the AST table sections. The constraints in each AST table section include an ASID, and other information supplied by the OS to the AHF to access operand addresses specified in user work requests.

Figure 3B:
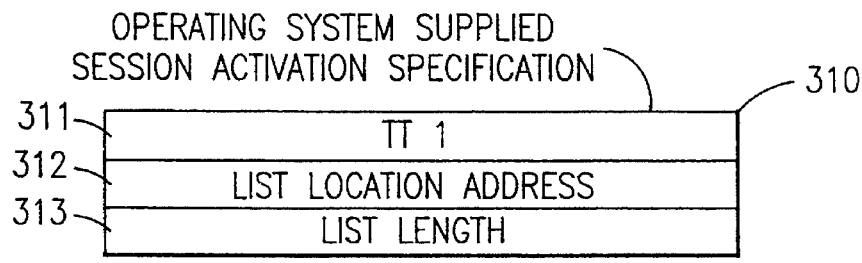
FIGS. 3B and 3C show a simple form of a session activation specification in an OS operation block (OB).
Figure 3C:
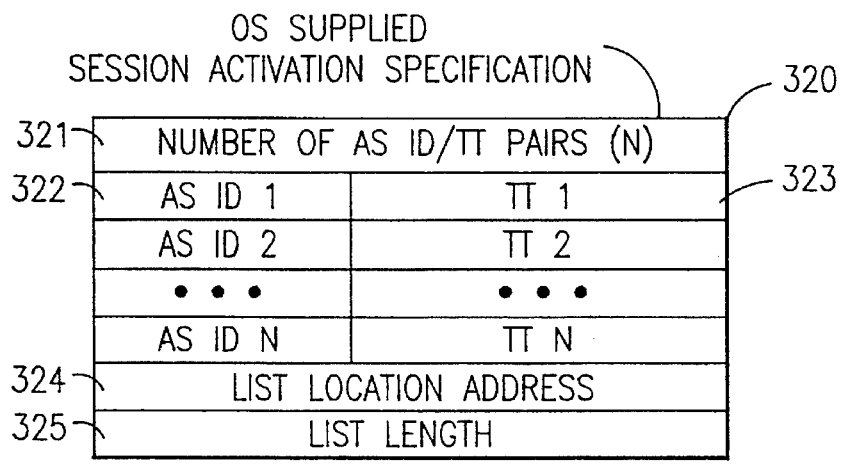
Figure 4A:
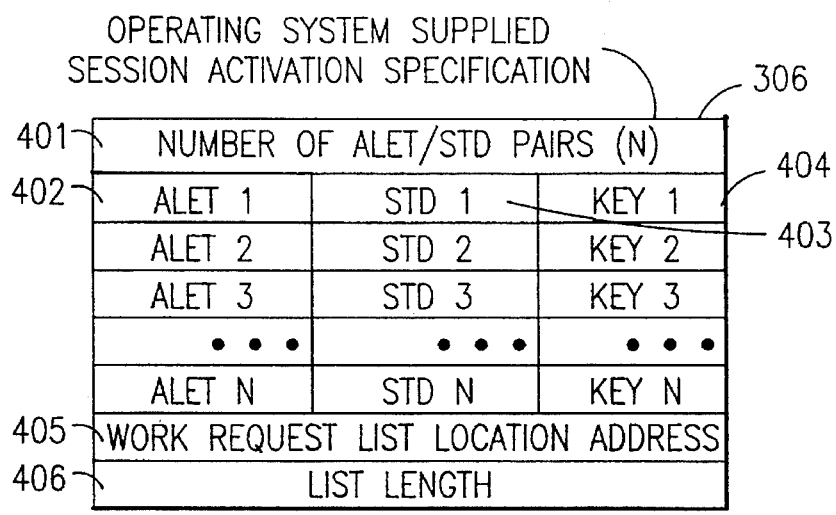
FIG. 4A shows a more complex form of the Session Activation Specification which is part of the Operation Block structure that is passed to the AHF during the initiation of each using program's work session by the OS.

FIGS. 3B, 3C and 4A show examples of different forms of SAS 310 and 320 structured for different computer architectures. SAS is an OS-to-AHF interface table that may be used in different computer architectures to establish a working session for a using program 103 with a selected AHF. These different forms of the SAS table primarily handle different ways that different computer architectures may identify address spaces. Some architectures have only a single real or virtual address space, and other architectures use plural virtual address spaces, and the different architectures may use different forms of address space identifiers (ASIDs). In many architectures, the addresses in a work request list are virtual addresses, and that the AHF must then perform the host CEC's Dynamic Address Translation (DAT) process on them in order to access their address translations to CEC real storage.

Hence, for generality, each ASID is herein considered to identify either a real address space, or a virtual address space defined by a Translation Table (TT) located in storage, for example in TT entry 311 in FIG. 3B. However, the form of the ASID is not a limitation on the subject invention, in which a translation table, TT, can be as simple as a single-value relocation of an address and an associated address limit check on the result, in which the using programs uses real addresses, relative to a segment of CEC storage in which they reside and to which they are to be constrained. The method of this invention can easily accommodate any CEC storage relocation scheme.

This invention has the AHF 102 (and not the CPs) perform host DAT in executing the AHF work requests. The effect is that accesses by the AHF (on behalf of using programs) are constrained to only the page frames (which back virtual addresses within host address spaces) that each using program is authorized to access in all its work requests during its current session with the AHF. The OPB 304 also locates in the using program storage 103 (see FIG. 1) its work request list 106 shown in FIGS. 1 and 3A by means of its entries: List Start Address and the List Length, which locate the list and its length. OPB 304 also contains a "response area" 307 used by the AHF 102 to notify the OS 107 of any unusual terminating conditions, e.g., a violation of access authority in an application work request.

FIG. 3B illustrates a relatively simple session activation specification table section 310 (represented as box 306 in FIG. 3A) in which entry TT1 identifies a single address space to the selected AHF, which may be the real address of the translation table containing the information required to handle operand addresses specified by the using program to actual real addresses in CEC storage. These could be offset and limit values, or the address of a complex virtual-to-real address translation structure. Table entries 312 and 313 define the location address and length of the work request list for the session being established in the addressable storage of the using program.

In FIG. 3C, table section 320 illustrates another form of the AST table section 306 of FIG. 3A, in which multiple address spaces are defined from which an AHF can access operands for a requesting using program. These address space identifiers also can be real addresses in different parts of CEC main storage, as described for FIG. 3B, or they may be virtual addresses within multiple address spaces which will be translated by the AHF using the same method as used by the Cps in the CEC. Entry 321 indicates the number of address spaces usable in the associated work request list. Each address space entry 322 specifies an Address Space Identification (AS. ID) and its Translation Table (TT) 323 to be used for addresses specified as being in that address space in a work request list entry. Entries 324 and 325 locate the work request list and its length in the using program's address space for the session being established.

FIG. 4A illustrates an AST table section 400 (which is still another form of 306 in FIG. 3A) for the IBM S/390 architecture such as is used in an IBM ES/9000 system CEC. The first entry 401 contains the number of address space entries in table section 400. Each address space entry contains an ALET (Access List Entry Token) 402, an STD (Segment Table Descriptor) 403, and a host storage key 404. The ALET is a token representing an ASID. The STD 403 is the real address of the virtual address translation table for the associated address space. Key 404 is an assigned host storage key which constrains all access to page frames backing the associated virtual address space, according to their storage key assignments. Since the AHF 102 makes its storage access requests for all work requests to the CEC storage system, they must be made with the assigned host storage key, or an access error will be indicated, and the storage access denied.

AST section 400 likewise contains the work request list locating address 405 and list length 406 for defining the list accessed for the particular session being activated. All storage accesses made using this defined work request list are guaranteed by hardware checking to only be in the storage assigned to this using program. This protects the entire CEC's system so that none of the independent using programs can cause the AHF 102 to violate the CEC's system data integrity or operating integrity in performing any of the using program work requests.

AHF CONTROLS

Accordingly, each AHF 102 is associated with an Active Session Table (AST) 105 in storage, which contains one or more table sections for the currently active sessions between it and all using programs 103 which can currently use that AHF. Thus, the table section 420 in FIG. 4A is established as a result of a request by the OS to do so. This is communicated through a Start Subchannel (SSCH) instruction, as described earlier.

The SCH ID addressed by the SSCH specifies the particular type of AHF that is being requested to establish an operating session with the using program. Each separate function AHF maintains its own separate AST of user sessions established with it, and for which its included processors perform requested work.

FIG. 4B illustrates the content of the AST 105 (see FIG. 1) created as result of use of the start session instruction to activate an active session with the AHF. Each AST table section is separately provided by the OS 107 as the operand of a different SSCH instruction that is executed to initiate each session. Once any of these SSCH instructions is completed, the newly created session and its AST table section are ready to be used. The constraints for this session are thus established and are now fixed for the life of the active session and cannot be modified by the using program or by the OS.

The Subchannel ID operand 301 from the SSCH instruction (FIG. 3) is placed into the Subchannel # field 423 when the AST section table is created, and provides a means for the facility processors 102 to link the AST section to its using program when the operation terminates. The operating system maintains a record of the session activation indexed by subchannel # to be used to complete the session when it terminates.

Each AST section table contains a lock word 421 that is used by the AHF processors 104 to ensure that only one of them is trying to service a particular active session at one time. An AHF processor 104 looking for new work must obtain the lock 421 of an AST section 420 before it can go to the work request list 106 specified by the list starting address 428 and list length 429 to see if there is a work request pending there. Only one AHF processor may be taking work from the list, or marking completion of a work request in the list, at any one time, though the lock is released when the processor has done its necessary processing of the list. The lock is not held while a processor performs a work request, however, so multiple processors may be concurrently executing different requests from the same list. The lock prevents more than one processor from accepting the same work request.

The AST section 420 contains the information necessary to do host dynamic address translation. That is, it contains the number 422 of ALET/STD pairs 424, a list of the ALETs 424 that can validly be used in AHF work requests, the Segment Table Descriptor (STD) 426 which defines each address space represented by an ALET in the ALET/STD list, and the host storage access key 427 to be used for an access to each virtual storage address space. Also, the AST section 420 contains the definition of the work request list 106 of the session, i.e., its starting address 428 within the application, and its length 429. Further, there is a cursor field, called the Next Request Address 430, which indicates which entry of the work request list should be examined next by any service processor 104 examining the list for new work. This next request address field 430 is updated by each processor 104 that takes a work request from the list while it still holds the AST section lock so that the next AHF processor that examines the list for work will examine the next AHF section. This processing makes it possible for an using program to have more than one work request outstanding at the same time, and further, to have multiple requests be processed concurrently by more than one AHF processor of the AHF.

FIG. 5 illustrates the parameter list 500 shown in FIG. 5 set up by the requesting using program. An entry 501 in this list specifies the number of address spaces identified in the list. Here, each of the address spaces (AS) is specified in an invocation list entry 502 as an ASID (address space identifier) 502. Another invocation list entry 503 contains a work "list location address" that locates a "work request list" in one of the using program's address spaces. Another invocation list entry 504 defines the length of the work request list located in entry 503. An example of a work request list is shown in FIG. 2.

The last entry 505 shown in FIG. 5 contains an identifier for the particular AHF in the CEC with which the requested session is to be invoked, such as a data move facility, a data compression facility, an encryption facility, a data filtering facility, and others may exist in the CEC, and in some cases more than one facility of the same type may exist in the CEC. The session currently being requested in the preferred embodiment example is presumed to be for a session with a data move facility.

The execution of the "start session instruction" (SSCH shown in FIG. 3A) sends the AHF the "session activation specification" 306 in the "operation block" 304. The AHF uses the content of the "session activation specification" 306 to build an "active session table section" (AST section) shown in FIG. 4B. The process of building the AST section sets up the requested session between the requesting using program and that particular AHF.

The "session activation specification" area contains a plurality of entries reserved for receiving the "session activation specification" 306. When specification 306 (shown in FIG. 4A) is sent by the OS via the start session instruction, it is copied by either the AHF instruction, the CPU, or by the OS into the "session activation specification" area of the selected AST section. The example in FIG. 4A shows each address space represented in respective rows, in which each address space is defined by an ALET (access list entry token) 402, a "segment table descriptor" (STD) 403, and a storage key (KEY) 403. The address space definition here is in terms of the IBM S/390 architecture, in which the ALET is a virtual identifier of an address space, the STD is a real storage address that locates a segment translation table which defines the address space, and KEY defines a storage key value assigned to the translated real storage of the address space.

FIGS. 3A and 3B show other examples of different forms of the session activation specification 306 (using any computer architecture) in the operation block 304 provided by the SSCH instruction execution. FIG. 3A shows a simple form of session activation specification 306 in an OS operation block (OB), while FIG. 3B shows a more complex form of the session activation specification 306. The list referred to in the entries of these specifications is the work request list of the requesting using program.

FIG. 4A shows a more complex form of the Session Activation Specification in the IBM S/390 architecture. FIG. 4B shows Active Session Table Sections used by the AHF to communicate with the activated work request lists.

The AHF build process is done by the AHF copying the received "session activation specification" 306 into any empty section 420 in its AST in FIG. 4B. A plurality of empty sections are initially created for the AHF. Each empty section has a lock field 421, a session number field 423, a "next request address" field 430, and a "session activation specification" area into which the received "session activation specification" 306 is copied. The SSCH number is written into the session number field 423 to identify the particular work request list of the requesting using program, which is need by the AHF to located the particular work request list in which an AHF processor scan is to be done; and the "next request address" field 430 locates the particular work request entry in that "work request list" at which the scan is to begin.

FIG. 2 shows an example of a "work request list" 106, in which each entry may receive the address of a user "work request specification" made by the using program, and in the address space of the using program.

Figure 6A:
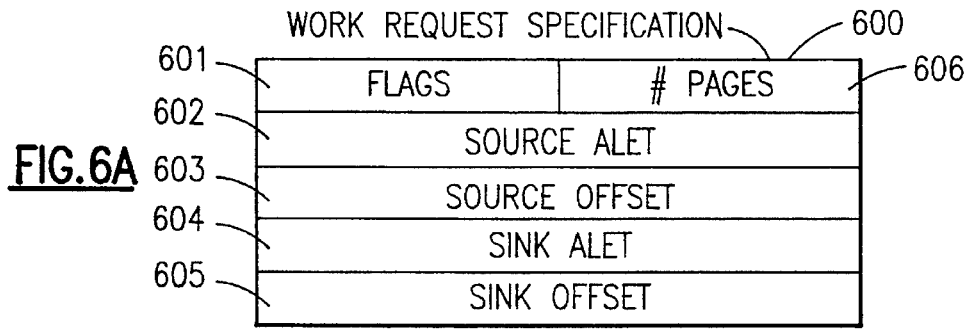
FIG. 6A is a Work Request Specification block used in the detailed embodiment, which receives a work request for the AHF, which is addressed by an entry in the work request list.
Figure 6B:
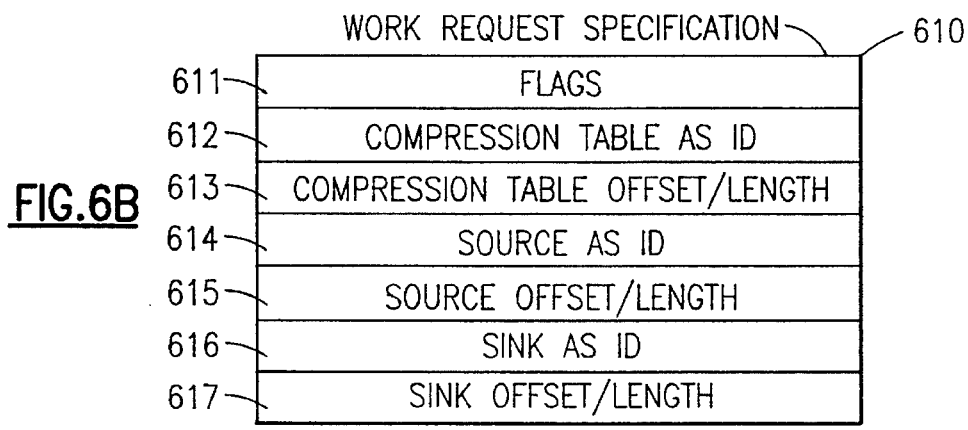
FIG. 6B is another example of a Work Request Specification for a work request to a different AHF that performs data compression and expansion of compressed data, which is a different type of AHF than the first represented AHF which may be a data mover type of AHF. The using program has a different work request list for each type of AHF with which the using program is having an active work session.

FIG. 6A shows an example of a "work request specification" of a work request list defining work requests to a data mover type of AHF. FIG. 6B shows an example of a "work request specification" of a work request list defining work requests to a data compression/decompression type of AHF.

Either of these types of "work request specification" may be addressed by the entries in the work request list of FIG. 2, or any other type of "work request specification" for any type of AHF may instead be addressed.

FIG. 6A indicates, as an example, the format presumed in the preferred embodiment of a work request specification which is addressed by the request specification address 202 in the work request list 200. This is the form in which an using program 103 in an active session with an AHF 102 specifies the work to be done. What is illustrated in the FIG. 6A is the format for an .operation on two address spaces, e.g., the source (specified by the source ALET 602 and offset 603) and target (specified by the sink ALET 604 and offset 605) locations. A page count 606 specifies the number of pages that are to be operated on by the AHF for this work request. An example of an AHF using these fields would be one that moves multiple pages within the CEC electronic storage, asynchronously to computation in the CP's of the CEC. The pages to be moved can be specified by the using program in multiple address spaces, using the work request specification 600. The Flag field 601 would indicate any special modifier to the specified operation. An example, using a data mover AHF, would be an optional specification that, instead of moving a set of pages from one location to another, the page at the source address be replicated in all pages specified as the target locations of the AHF operation. In other words, during the operation, the target address is incremented after each page move, but the source address remains unchanged.

FIG. 6B is an example of a Work Request Specification 610 for an AHF that performs data compression and expansion. The Flags 611 indicate the selection of any functional option offered by the AHF. One example is the specification of a compression operation, or an expansion operation. The AS ID 612 and Compression Table Offset and Length 613 are specified, as are the source data address space 614, address and length 615, and the sink location address space 616 and sink location address and length 617. The source location contains the data to be compressed or expanded and the sink location receives the result data. The work request specification format is a defined interface between an AHF and its using programs. The work request specification format can be uniquely defined for each AHF type, consistent with the operations it is to perform and the operands that must be specified. As can readily be seen, the methods of this invention can be applied easily to use of many kinds of AHF. The two types described here are used to illustrate the method.

Figure 7:
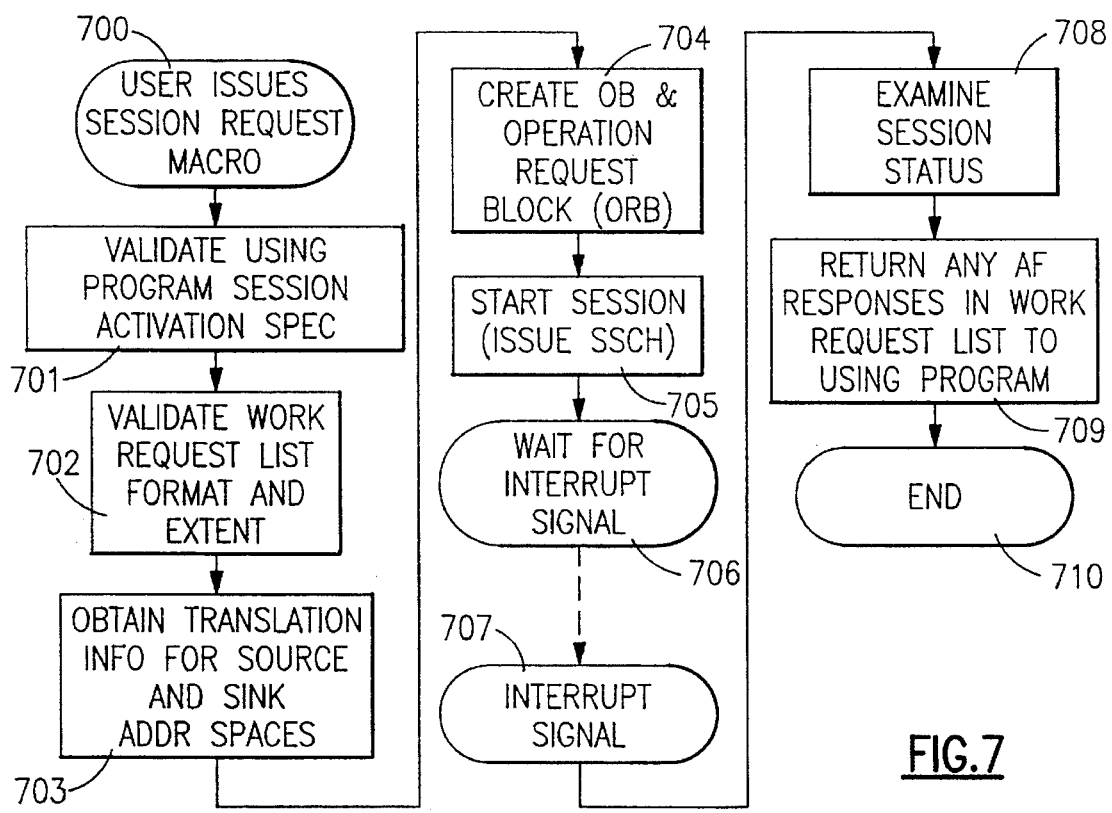
FIG. 7 shows the series of steps performed by the operating system to validate and initiate a session on the asynchronous hardware facility.

FIG. 7 illustrates the logic of the OS on receipt of a request from an unprivileged using program 103 to have a session established for its direct use of the AHF 102. This is the series of checks and operations that comprise the invocation process 109 in FIG. 1. The using program 103 calls the OS 107 which causes the OS 107 to enter the flowchart at step 700. The AHF for this description is one whose session activation specification is of the type shown in FIG. 4. Step 701 checks and validates the parameters 500 of the program request. In this step, the format of the parameters is checked for correctness and each ALET 502 is checked to ensure that it defines a valid address space for the using program 103 that made the request. If an invalid address space is found the operation would be terminated.

Step 702 ensures that the starting address of the work request list 503 provided in the parameters is in using program storage 101 that is addressable by the using program 103 that made the request, and that the entire list extent as determined by the list length 504 is in the same using program storage.

Step 703 creates the session activation specification table 306 shown in FIG. 4, providing the Translation Table information necessary to handle operand addresses. In this example, the SAS contains an STD 403 defining each space represented by an ALET 402 to be used by the using program in its direct requests to the hardware AHF and the storage key value 404 that is to be used by the AHF in making requests to the address space defined by the ALET/ STD. The STD is to be used by the AHF in order to find the backing pages for the virtual pages specified in the applications work requests during the work session. The AHF must perform host processor DAT to find its operands in host storage.

This preserves the isolation provided by separate address spaces. This table provides the means whereby each using program can be prevented from addressing locations it is not authorized to access, through the privileged access of the hardware AHF.

Step 704 creates the Operation Request Block (ORB) 302, and the Operation Block (OPB) 304, as shown in FIG. 3. The OS 107 requests in step 705, by issuing the SSCH instruction 300, that the hardware initiate a work session as defined by the ORB 302 and the OPB 304 which contains the session activation specification 306, on the AHF type addressed by the SCH ID used in the SSCH instruction. The OS 107 then logically awaits completion of the session established, indicated in step 706, going on to other work until an interruption is received from the hardware.

When the interruption signal is received at step 707, the control program examines completion status in the OPB response area 307 in step 708, and translates it into feedback to the using program, step 709.

The OS 107 processing for this request is complete and ends in step 710.

Figure 8A:
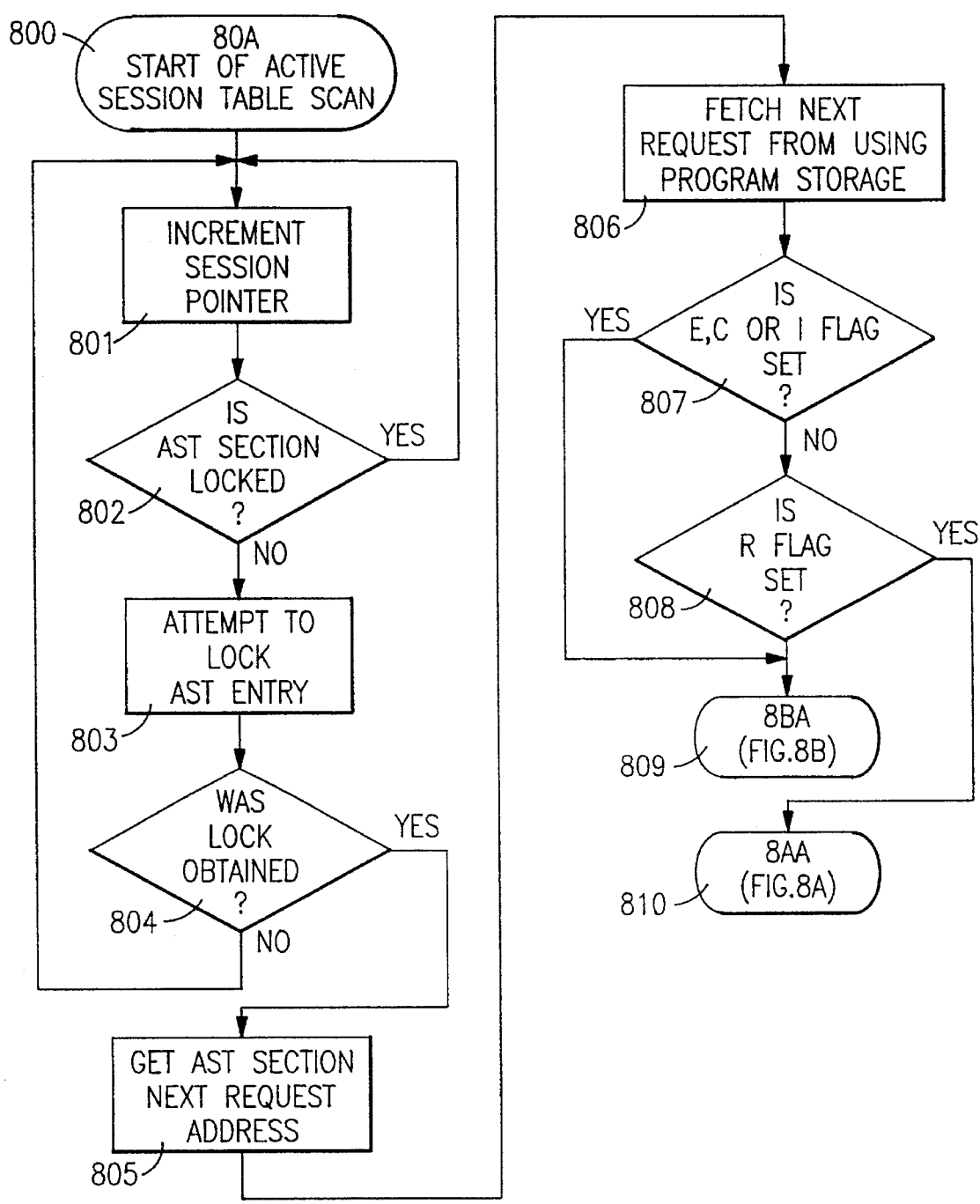
FIGS. 8A, 8B, and 8C show a series of steps performed by an AHF to detect when a work request has been entered on an active work request list 106, to subsequently execute that request, and to post completion on the same active work request list.

FIG. 8A shows a process used by an AHF processor 104 in an asynchronous hardware facility 102 which looks for work among all active work sessions currently established for the AHF. All processors of the AHF follow this logic in order that all active session receive service, as processors are available to perform requested work. Step 800 is the start of each processor's processing when it starts looking for new work and is entered from a reset or idle state, or when processing of prior requests has completed. Each AHF processor 104 maintains a AST pointer 110 that is used to keep track of which active session in the AST 105 is currently being processed or was the last active session processed by this AHF processor 104. The AST pointer 110 is incremented to look at the, next session, the next AST section in the AST 105 to be examined for new work at step 801. The AST 105 shown in FIG. 5 is accessed at the section specified by the incremented AST pointer 110 of step 801 at step 802. If the particular session being examined is locked, the processor will go on to the next active session since another processor is servicing the one in locked state. If the unlocked state is observed, step 803 does a hardware-interlocked update to obtain the lock. If it is not obtained, another processor has gotten the lock in competition with this one, and this processor can go on to the next active session looking for work there.

Thus, it goes to step 801. If, however, the lock is obtained, the Next Request Address of the AST is used to access the next entry to be serviced in that session's work request list. The contents of that entry are accessed at step 806 and examined at step 807. If the E, C, or I flag is set in that entry, there is no work to perform, and control passes to step 809, which indicates that control will continue at 8BA on FIG. 8B.

Figure 8B:
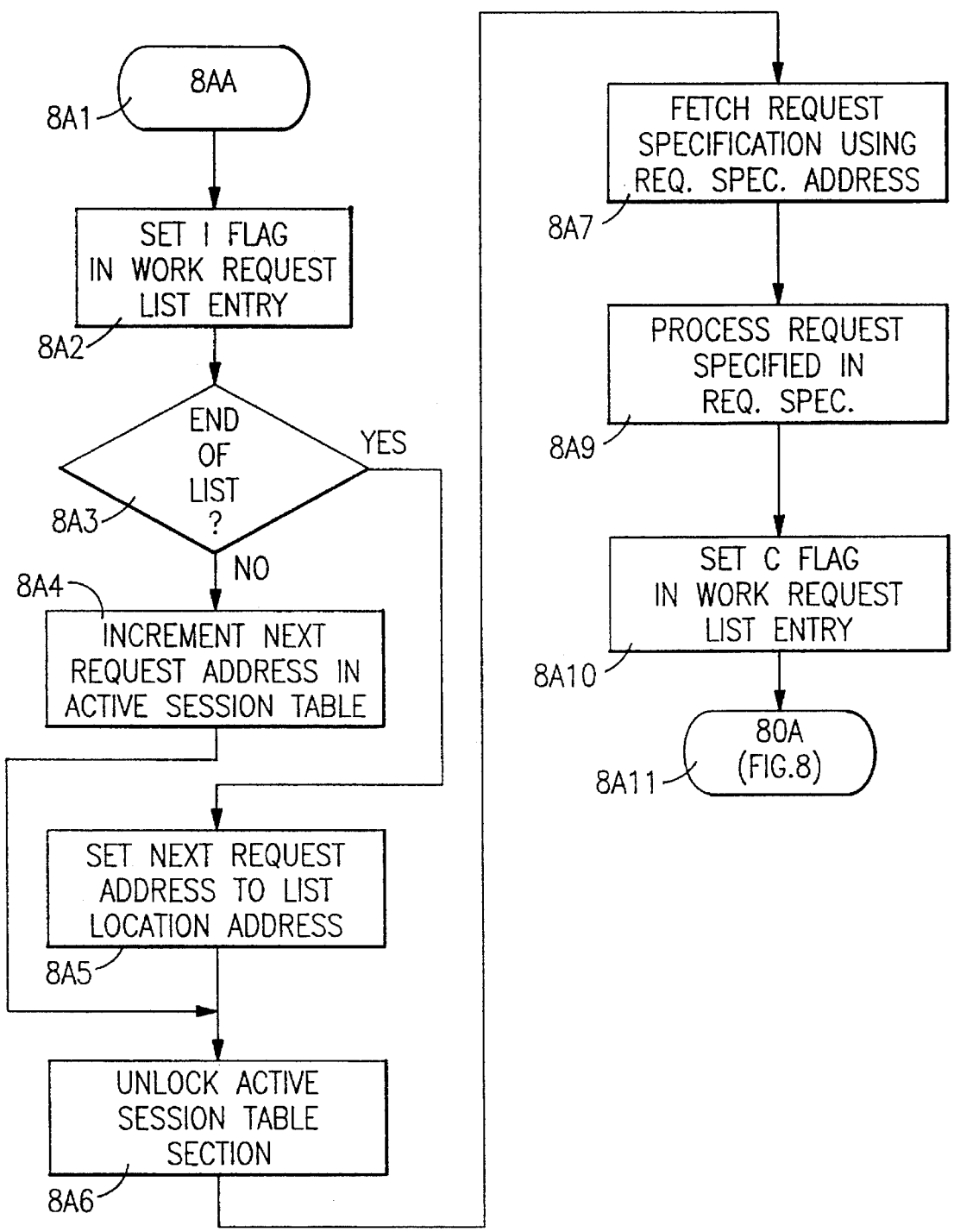

If, however, the R flag is set, the entry contains the specification of a work request to be performed, and control passes to step 810, which indicates that execution will be continued at 8AA on FIG. 8B.

FIG. 8B is reached when an AHF processor finds a work request entry that is "ready" with a request to be performed. Execution here begins at 8AA at step 8A1. Since the processor handling this request is to perform it, the entry is set to in-process (I) at step 8A2.

Next the list cursor, called next request address 430, must be advanced so that the next processor (this one or another) that looks at the list will examine the next entry. Step 8A4 tests for the end of the list, and if the entry being processed is the last, step 8A5 sets the next request address to the top entry on the list. If not the end of the list, step 8A4 increments the next request address to the next entry on the list. In both cases, the updated address is placed back into the AST (FIG. 4A). The lock on the AST section may now be released. This logic allows other processors to find and perform other requests for work generated by the same AHF session, concurrently with others being processed by other processors. A using program, or programming subsystem, may be structured such that the process of generation of work requests is asynchronous to the recognition and processing of AHF work request completions in the operation of the program.

This allows the using program to put requests on the list as the logic determines that the work is needed without regard for when other work requests complete, and to process completions as a separate task when each actually does complete. The using program does this by checking the work request list entries of still outstanding requests for completion at some periodic point in its logical execution. The lock is released at step 8A6. Step 8A7 fetches the work request specification using the request specification address from the request list entry addressed by the original value of the next request address in the AST section (before it was incremented to the logically next section in the AST). This field, in the work request list entry, addresses a work request specification as shown in FIG. 6. In step 8A9, the work specification is processed. The necessary host dynamic address translation is performed by the AHF processor, without recourse to the main host processors, by using the ALET's to find the correct STD's for the space containing operands of the work request (ALET to STD translations are found in the AST, FIG. 4A), and to perform the requested function of the AHF servicing this session.

This processing is performed asynchronously to execution of the requesting program and to the OS, in the separate processors of the AHF. When an AHF processor completes the request it has undertaken, it sets the state field of the work request list entry that it is processing to the C (complete) state. At step 8A10, the processor returns to the processing described on FIG. 8A at step 800, where it will look for another work request to process, from any active session for this functional type of AHF.

Figure 8C:
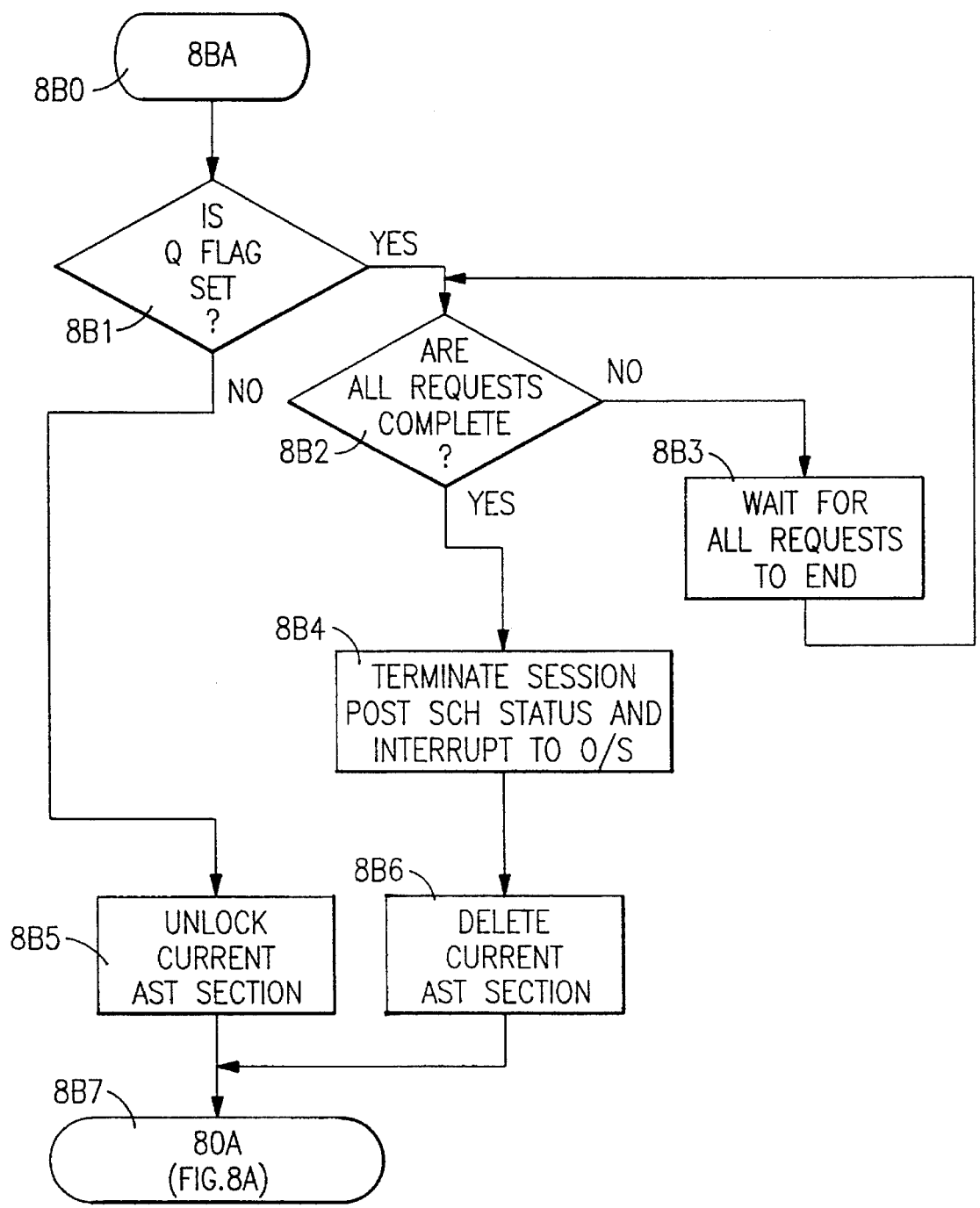

FIG. 8C is reached at step 8BA when the state field of a work request list entry is not E, C, I, or R. In step 8B1, a test is made for Q state. If it is not Q, no further processing of the entry can be done, so the AHF session is unlocked at step 8B5 and return is made to 80A on FIG. 8. If the state is Q, a check is made, at step 8B2, that all other request entries on this work request list have completed.

If other processors of the AHF are still processing one or more requests for this AHF session, this processor must await their completion, done at step 8B3. This can be done by scanning the work list for entries still in the I state. When all work requests have been completed, the session will be terminated, at step 8B4, where any completion status defined for this AHF is placed into the ORB response area, and a hardware interruption is generated to the OS to signal completion of an active session. The AST section for this session is now deleted by step 8B6, and the AHF processor goes on for the search for new work at 80A on FIG. 8A.

It should be understood that the above-described embodiments of this application are presented as examples and not as limitations. Modification may occur to those skilled in the art. Accordingly, the invention is not to be regarded as being limited by the embodiments disclosed herein, but as defined by the appended claims.

What is claimed is:

1. A method of structuring a session interface between a software operating system (OS) operating in privileged state and a using program operating in a non-privileged state for enabling a session of direct control by the using program over an asynchronous hardware facility (AHF) in a computing system controlled by the privileged OS, the method comprising steps of:

initiating the session by transferring a request by the non-privileged using program to the OS for the OS to set up a direct communication facility between the using program and the AHF, the request containing locating information for locating a work request list (WRL) in an address space of the using program, structuring the direct communication facility by the OS allocating an active session table (AST) in a hardware system area (HSA) in system storage accessible to the OS and to an AHF processor of the AHF, the AST being structured with an AST section for each using program requesting a session with the AHF, writing by the OS into an AST section associated with a respective using program of WRL address information for enabling the AHF to access the WRL, the WRL being accessible to the respective using program but the HSA, the AST and the AST section not being accessible by the respective using program, storing by the using program of any number of AHF work requests in the WRL accessible to the using program, scanning by an AHF processor of the AST section for locating the WRL of an associated using program when the AHF processor is not executing a work request, executing by the AHF processor of any AHF work request found in the WRL during the scanning step, and posting by the AHF processor in the WRL of a completion indication when the AHF has completed work specified in the AHF work request performed by the executing step to directly provide the using program with an indication of availability of AHF work results without intervention by the OS in user request or AHF work completion communications between the AHF and the using program during the session.

2. A method of structuring a session interface between a software operating system (OS) operating in privileged state and a using program operating in a non-privileged state, as defined in claim 1, the method further comprising:

the structuring step also writing in each AST section access constraining information for constraining accesses made by the AHF processor for the using program in a storage of the computing system accessible to the using program, the executing step for each AHF work request found in the WRL of the user program being constrained by the constraining information in the AST section to enable the AHF to concurrently perform requests for different user programs with different access constraints.

3. A method of structuring a session interface between a software operating system (OS) operating in privileged state and a using program operating in a non-privileged state, as defined in claim 2, the method further comprising:

returning to scanning by the AHF of a next AST section when an AHF processor is .available for performing work of another work request by any using program in the AST.

4. A method of structuring a session interface as defined in claim 2, further comprising the step of:

writing by the AHF in the session table of a next entry address for the using program, the next entry address locating a next work entry in the work request list of the using program, the next work entry following a work entry last accepted by the AHF processor for performing specified AHF work.

5. A method of structuring a session interface as defined in claim 2, further comprising the steps of:

executing by the using program of a start session request to the OS requesting execution of a supervisory start session instruction for accessing an operation block containing user identification and constraint information on accesses by the using program, and executing by the OS of the start session instruction to generate an AST section for the using program to communicate the constraint information to the OS to modify the session table for use by the AHF.

6. A method of structuring a session interface as defined in claim 2, further comprising the steps of:

executing by the using program of a program call to the OS to request execution of a supervisory start I/O subchannel (SSCH) instruction for accessing an operation block containing a session activating specification having user-address constraint information and a user identifier, and executing by the OS of the start I/O subchannel instruction (SSCH) to communicate to the AHF of the session activating specification, and setting up a session section in the active section table in storage accessible to the AHF and not accessible to the using program to enable the AHF to perform work for the using program without OS intervention.

7. A method of structuring a session interface as defined in claim 5, further comprising the steps of:

providing an address space token as constraint information in the user call, translating by the OS of the address space token into a translation table address for which the translation table represents a virtual address space, and writing the translation table address into the AST section for the user program as an access constraint for the using program to be enforced by the AHF when accessing storage on behalf of the using program.

8. A method of structuring a session interface as defined in claim 7, further comprising the step of:

detecting by the OS if any storage key is provided in the user call for storage pages assigned to the virtual address space, and writing the storage key into the AST section in association with the translation table address as a storage access constraint for the using program.

9. A method of structuring a session interface as defined in claim 2, further comprising the steps of:

providing by the OS of a lock field in each AST section of the AST, setting by a processor of the lock field to a locked state before modifying any entry in the AST section, and resetting the lock field after the processor has completed modifying the entry.

10. A method of structuring a session interface as defined in claim 2, further comprising the steps of:

AHF processing of a plurality of session sections associated with a plurality of using programs in the same AST, reading by any AHF processor of a next entry address in any session section when the AHF processor is performing the scanning step.

11. A method of structuring a session interface as defined in claim 10, further comprising the steps of:

AHF processing by using a plurality AHF processors, any AHF processor scanning any session session in the AST, and reading by the AHF processor of the next entry address in any session section when the AHF processor is performing the scanning step.

12. A method of structuring a session interface as defined in claim 2, further comprising the step of:

setting by the using program of a status field in each request entry in the work request list to control interactions between the using program and the AHF processors.

13. A method of structuring a session interface as defined in claim 12, further comprising the step of:

writing an empty indication (E) initially the status field in every request entry in the work request list to indicate no work is being indicated by any entry.

14. A method of structuring a session interface as defined in claim 12, further comprising the step of:

writing by the using program of a ready indication (R) in the status field in a request entry after the using program writes an AHF work specification in the request entry.

15. A method of structuring a session interface as defined in claim 12, further comprising the step of:

writing by the AHF processor of an "in process" indication (I) in the status field of the next work entry in the work request list found to have the R indication in its status field.

16. A method of structuring a session interface as defined in claim 12, further comprising the step of:

writing by the AHF processor of a "request complete" indication (C) in the status field after the AHF processor completes work specified in the work entry.

17. A method of structuring a session interface as defined in claim 12, further comprising the steps of:

writing by the using program of a "quit" indication (Q) in the status field of the next work entry to be accepted by the AHF when the using program wants to end a session with the AHF, detecting by the AHF of the quit indication in the next work entry of the work request list, invalidating the session section associated with the using program having the indication in its work request list when all work is complete for the session section, and signalling by the AHF processor to the OS to invalidate the session section for the using program in the AST while identifying the using program to the OS.

* * * * *